(12) United States Patent
Hahn et al.

(10) Patent No.: US 12,591,909 B2
(45) Date of Patent: *Mar. 31, 2026

(54) METHODS, SYSTEMS, AND MEDIA FOR REVIEWING CONTENT TRAFFIC

(71) Applicant: Integral Ad Science, Inc., New York, NY (US)

(72) Inventors: David Brett Hahn, Montclair, NJ (US); Alan Murray, Weston, VT (US)

(73) Assignee: Integral Ad Science, Inc., New York, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/839,398

(22) Filed: Jun. 13, 2022

(65) Prior Publication Data

US 2022/0327573 A1    Oct. 13, 2022

Related U.S. Application Data

(63) Continuation of application No. 16/590,771, filed on Oct. 2, 2019, now abandoned, which is a continuation
(Continued)

(51) Int. Cl.
*G06Q 30/0242* (2023.01)

(52) U.S. Cl.
CPC ................................. *G06Q 30/0246* (2013.01)

(58) Field of Classification Search
CPC ................................................ G06Q 30/0246
(Continued)

(56) References Cited

U.S. PATENT DOCUMENTS

| | | | | |
|---|---|---|---|---|
| 6,907,566 B1 * | 6/2005 | McElfresh | ......... | G06Q 30/0255 705/14.69 |
| 7,698,236 B2 * | 4/2010 | Cox | ...................... | G06Q 30/02 348/473 |

(Continued)

FOREIGN PATENT DOCUMENTS

| | | | | | |
|---|---|---|---|---|---|
| JP | 2001344279 A | * | 12/2001 | ............. | G06F 17/30 |
| WO | WO-0062204 A1 | * | 10/2000 | ........... | G06F 16/958 |
| WO | WO-0124524 A1 | * | 4/2001 | ............. | H04N 7/163 |

OTHER PUBLICATIONS

Ghose et al. An Empirical Analysis of Search Engine Advertising: Sponsored Search in Electronic Markets. (Oct. 2009). Retrieved online May 18, 2019. https://repository.upenn.edu/cgi/viewcontent.cgi?article=1149&context=oid_papers (Year: 2009).*

(Continued)

*Primary Examiner* — James A Reagan
(74) *Attorney, Agent, or Firm* — Byrne Poh LLP

(57) ABSTRACT

Methods, systems, and media for review content traffic are provided. In accordance with some embodiments of the present invention, a method, implemented on a processor, for reviewing advertisement placement on webpages is provided. The method can include: receiving a plurality of uniform resource locators (URLs) relating to the placement of a plurality of advertisements associated with an advertiser; obtaining, for the plurality of URLs, a plurality of images and a plurality of advertisement traffic and rating information relating to each of the plurality of URLs, wherein each of the plurality of images shows the placement of an advertisement on the page accessed by a URL; presenting a traffic display that includes the plurality of images for the plurality of pages, wherein the plurality of images are user selectable; and, in response to selecting one of the plurality of images, presenting the advertiser with the advertisement traffic and rating information for a URL
(Continued)

Low Safety    0    250    500    750    1000    High Safety corresponding to the selected image and providing the advertiser with an opportunity to provide feedback information for the rating information associated with the URL.

19 Claims, 11 Drawing Sheets

Related U.S. Application Data of application No. 14/921,549, filed on Oct. 23, 2015, now Pat. No. 10,438,234, which is a continuation of application No. 13/152,070, filed on Jun. 2, 2011, now Pat. No. 9,195,990.

(60) Provisional application No. 61/350,659, filed on Jun. 2, 2010.

(58) Field of Classification Search
USPC ........................................................ 705/14.45
See application file for complete search history.

(56) References Cited

U.S. PATENT DOCUMENTS

| | | | | | |
|---|---|---|---|---|---|
| 8,036,936 | B2 * | 10/2011 | Ramaswamy | ..... | G06Q 30/0271 |
| | | | | | 705/14.42 |
| 8,595,072 | B2 * | 11/2013 | Luttrell, Jr. | ........ | G06Q 30/0277 |
| | | | | | 705/50 |
| 8,732,017 | B2 * | 5/2014 | Attenberg | .......... | G06Q 30/0241 |
| | | | | | 705/14.6 |
| 9,646,324 | B2 * | 5/2017 | Choi | ................. | G06Q 30/0246 |
| 2002/0095443 | A1 * | 7/2002 | Kovack | ................. | G06F 40/221 |
| | | | | | 715/251 |
| 2003/0093790 | A1 * | 5/2003 | Logan | .................... | G11B 27/34 |
| | | | | | 725/38 |
| 2003/0149938 | A1 * | 8/2003 | McElfresh | ......... | G06Q 30/0269 |
| | | | | | 715/251 |
| 2003/0210819 | A1 * | 11/2003 | Spinat | ................... | G06F 16/954 |
| | | | | | 382/201 |
| 2004/0193870 | A1 * | 9/2004 | Redlich | ............... | G06F 21/6245 |
| | | | | | 713/154 |
| 2007/0260520 | A1 * | 11/2007 | Jha | ......................... | G06Q 30/02 |
| | | | | | 705/14.44 |
| 2008/0033815 | A1 * | 2/2008 | Choi | .................. | G06Q 30/0256 |
| | | | | | 705/14.54 |
| 2008/0040217 | A1 * | 2/2008 | Dellovo | ............. | G06Q 30/0245 |
| | | | | | 705/14.54 |
| 2008/0086361 | A1 * | 4/2008 | Eliezerov | ........... | G06Q 30/0203 |
| | | | | | 705/7.32 |
| 2008/0103896 | A1 * | 5/2008 | Flake | .................... | G06Q 30/02 |
| | | | | | 705/14.43 |
| 2008/0162257 | A1 * | 7/2008 | Garg | .................. | G06Q 30/0242 |
| | | | | | 705/14.41 |
| 2009/0119179 | A1 * | 5/2009 | Kolve | .................... | G06Q 30/02 |
| | | | | | 705/14.36 |
| 2009/0171948 | A1 * | 7/2009 | Solomon | ............... | G06F 16/435 |
| 2009/0210385 | A1 * | 8/2009 | Ramaswamy | ..... | G06Q 30/0254 |
| 2009/0271289 | A1 * | 10/2009 | Klinger | .............. | G06Q 30/0601 |
| | | | | | 705/26.1 |
| 2010/0063876 | A1 * | 3/2010 | Godden | ................. | G06Q 30/02 |
| | | | | | 345/441 |
| 2010/0114703 | A1 * | 5/2010 | Steelberg | ........... | G06Q 30/0276 |
| | | | | | 705/14.54 |
| 2010/0228636 | A1 * | 9/2010 | Silverman | .......... | G06Q 30/0275 |
| | | | | | 705/26.1 |
| 2010/0293063 | A1 * | 11/2010 | Atherton | ................ | G06Q 30/02 |
| | | | | | 705/14.73 |
| 2011/0047006 | A1 * | 2/2011 | Attenberg | .......... | G06Q 30/0282 |
| | | | | | 705/7.29 |
| 2011/0106634 | A1 * | 5/2011 | Luttrell, Jr. | ........ | G06Q 30/0277 |
| | | | | | 705/14.73 |
| 2011/0238688 | A1 * | 9/2011 | Mercuri | ................ | G06F 16/958 |
| | | | | | 707/769 |
| 2011/0258031 | A1 | 10/2011 | Valin et al. | | |
| 2011/0295680 | A1 * | 12/2011 | Shaw | ................. | G06Q 30/0273 |
| | | | | | 705/14.69 |
| 2011/0313850 | A1 * | 12/2011 | Hahn | ................. | G06Q 30/0246 |
| | | | | | 705/14.45 |
| 2012/0010927 | A1 * | 1/2012 | Attenberg | ............... | G06F 16/95 |
| | | | | | 705/14.4 |
| 2015/0262250 | A1 * | 9/2015 | Ramaswamy | ..... | G06Q 30/0277 |
| | | | | | 705/14.67 |

OTHER PUBLICATIONS

Federal Trade Commission. Marketing Violent Entertainment to Children. (Jul. 2004). Retrieved online May 4, 2021. https://www.ftc.gov/sites/default/files/documents/reports/marketing-violent-entertainment-children-fourth-follow-review-industry-practices-motion-picture/040708kidsviolencerpt.pdf (Year: 2004).*

Notice of Allowance dated May 23, 2019 in U.S. Appl. No. 14/921,549, pp. 1-120.

Notice of Allowance dated Jul. 17, 2015 in U.S. Appl. No. 13/152,070, pp. 1-31.

Office Action dated Feb. 1, 2013 in U.S. Appl. No. 13/152,070, pp. 1-14.

Office Action dated May 7, 2021 in U.S. Appl. No. 16/590,771, pp. 1-363.

Office Action dated Jul. 19, 2017 in U.S. Appl. No. 14/921,549, pp. 1-45.

Office Action dated Aug. 20, 2013 in U.S. Appl. No. 13/152,070, pp. 1-16.

Office Action dated Nov. 29, 2013 in U.S. Appl. No. 13/152,070, pp. 1-19.

Office Action dated Dec. 13, 2021 in U.S. Appl. No. 16/590,771, pp. 1-19.

* cited by examiner

Publisher Watch List by Category
Composition of High & Very High Risk Impressions High & Very High Risk Impressions (%)

Click on legend to toggle data points on and off

Adult
Illegal Drugs
Alcohol
Hate Speech
Offensive Language
Torrents and Warez

510

520

METHODS, SYSTEMS, AND MEDIA FOR REVIEWING CONTENT TRAFFIC

CROSS-REFERENCE TO RELATED APPLICATIONS

This application is a continuation of U.S. patent application Ser. No. 16/590,771, filed Oct. 2, 2019, which is a continuation of U.S. patent application Ser. No. 13/152,070, filed Jun. 2, 2011, which claims the benefit of U.S. Provisional Patent Application No. 61/350,659, filed Jun. 2, 2010, each of which is hereby incorporated by reference herein in its entirety.

FIELD OF THE INVENTION

The disclosed subject matter generally relates to methods, systems, and media for reviewing content traffic.

BACKGROUND OF THE INVENTION

Media content, such as advertisements, is created with the goal of having the content viewed, listened to, or otherwise received by a target audience. The target audience may be, for example, one or more users with a set of particular interests or one or more of users falling in a particular demographic or psychographic group. However, distributing such media content to the desired audience is a difficult process. It is often difficult for advertising networks, publishers, advertisers, and/or advertising agencies (collectively referred to herein as "advertisers") to control and manage the service and placement of their advertisements. More particularly, these advertisers lack control over the distribution of their advertisements and are generally concerned with the quality of the content (e.g., web content, the overall web site, etc.) with which they are displayed. Even further, it is difficult for advertisers to manage advertisement serving on a real-time basis.

In a more particular example, advertising networks may juxtapose advertisements with undesirable content due both to the opacity of the ad-placement process and possibly to a misalignment of incentives in the ad-serving ecosystem. Currently, neither the advertising network nor the brand can recognize efficiently whether a site contains or has a tendency to contain questionable or objectionable content.

There is therefore a need in the art for approaches for reviewing content traffic. Accordingly, it is desirable to provide methods, systems, and media that overcome these and other deficiencies of the prior art.

SUMMARY OF THE INVENTION

Generally speaking, these mechanisms provide an interactive inventory management application (sometimes referred to herein as "the application"). More particularly, the application can provide an advertiser with a real-time view of the uniform resource locators (URLs) at an individual page level on which advertisements are served. The application can be used to monitor the performance of an advertiser's inventory (e.g., advertisements), manage campaigns, manage publishers, and/or configure the placement of advertisements on new web pages.

These mechanisms can be used in a variety of applications. For example, these mechanisms provide an inventory management application that allows advertisers, ad networks, publishers, site managers, and other entities to review particular advertisement placements in real-time (e.g., worst five hundred placements, most viewed placements, advertisements with publishers that tend to have high risk adult content, etc.) for a given inventory of advertisements. In another example, the application may provide advertisers with the opportunity to assess and/or evaluate an advertisement campaign that has been served over various web sites or a publisher that has web content on which an advertisement is adjacently placed.

Methods, systems, and media for review content traffic are provided. In accordance with some embodiments of the present invention, a method, implemented on a processor, for reviewing advertisement placement on webpages is provided. The method can include: receiving a plurality of uniform resource locators (URLs) relating to the placement of a plurality of advertisements associated with an advertiser; obtaining, for the plurality of URLs, a plurality of images and a plurality of advertisement traffic and rating information relating to each of the plurality of URLs, wherein each of the plurality of images shows the placement of an advertisement on the page accessed by a URL; presenting a traffic display that includes the plurality of images for the plurality of pages, wherein the plurality of images are user selectable; and, in response to selecting one of the plurality of images, presenting the advertiser with the advertisement traffic and rating information for a URL corresponding to the selected image and providing the advertiser with an opportunity to provide feedback information for the rating information associated with the URL.

In some embodiments, a system for rating webpages for safe advertising is provided, the system comprising a processor that: receives a plurality of uniform resource locators (URLs) relating to the placement of a plurality of advertisements associated with an advertiser; obtains, for the plurality of URLs, a plurality of images and a plurality of advertisement traffic and rating information relating to each of the plurality of URLs, wherein each of the plurality of images shows the placement of an advertisement on the page accessed by a URL; presents a traffic display that includes the plurality of images for the plurality of pages, wherein the plurality of images are user selectable; and, in response to selecting one of the plurality of images, presents the advertiser with the advertisement traffic and rating information for a URL corresponding to the selected image and providing the advertiser with an opportunity to provide feedback information for the rating information associated with the URL.

In some embodiments, a non-transitory computer-readable medium containing computer-executable instructions that, when executed by a processor, cause the processor to perform a method for rating webpages for safe advertising, the method comprising: receiving a plurality of uniform resource locators (URLs) relating to the placement of a plurality of advertisements associated with an advertiser; obtaining, for the plurality of URLs, a plurality of images and a plurality of advertisement traffic and rating information relating to each of the plurality of URLs, wherein each of the plurality of images shows the placement of an advertisement on the page accessed by a URL; presenting a traffic display that includes the plurality of images for the plurality of pages, wherein the plurality of images are user selectable; and, in response to selecting one of the plurality of images, presenting the advertiser with the advertisement traffic and rating information for a URL corresponding to the selected image and providing the advertiser with an opportunity to provide feedback information for the rating information associated with the URL.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

FIG. 1 is a diagram of an illustrative rating scale in accordance with some embodiments of the disclosed subject matter.

FIG. 2 is an illustrative logon screen displayed by the application in accordance with some embodiments of the disclosed subject matter.

DETAILED DESCRIPTION OF THE INVENTION

Figure 3:
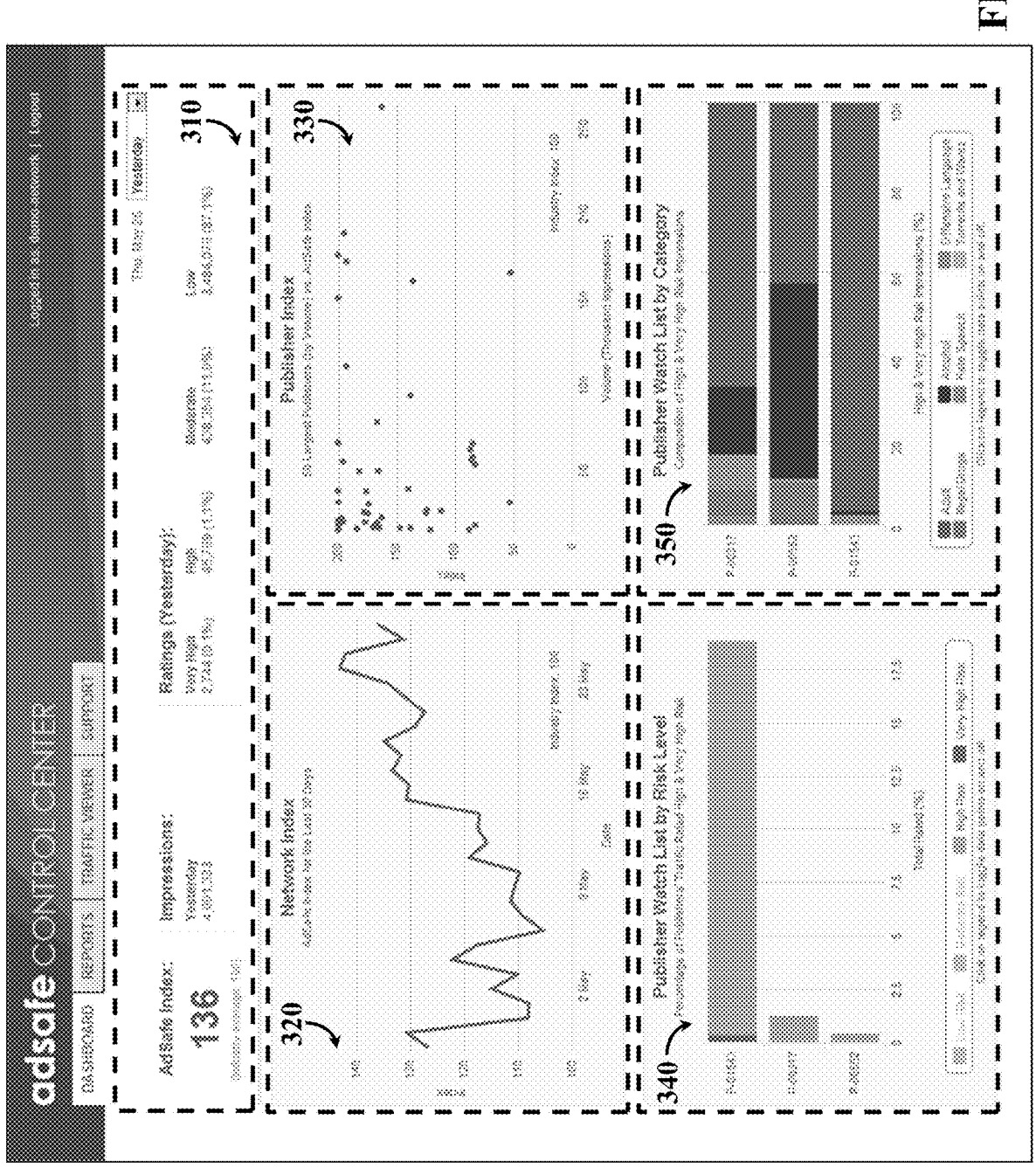
FIG. 3 is an illustrative dashboard screen displayed by the application in accordance with some embodiments of the disclosed subject matter.

Generally speaking, these mechanisms provide an interactive inventory management application (sometimes referred to herein as "the application"). More particularly, the application can provide advertisers with a real-time view of the uniform resource locators (URLs) at an individual page level on which advertisements are served. The application can be used to monitor the performance of an advertiser's inventory (e.g., advertisements), manage campaigns, manage publishers, and/or configure the placement of advertisements on new web pages.

These mechanisms can be used in a variety of applications. For example, these mechanisms provide an inventory management application that allows advertisers, ad networks, publishers, site managers, and other entities to review particular advertisement placements in real-time (e.g., worst five hundred placements, most viewed placements, advertisements with publishers that tend to have high risk adult content, etc.) for a given inventory of advertisements. In another example, the application may provide advertisers with the opportunity to assess and/or evaluate an advertisement campaign that has been served over various web sites or a publisher that has web content on which an advertisement is adjacently placed.

In accordance with some embodiments of the present invention, a method, implemented on a processor, for reviewing advertisement placement and content traffic is provided. The method can include, among other things, receiving a plurality of uniform resource locators (URLs) relating to the placement of a plurality of advertisements associated with an advertiser; obtaining, for the plurality of URLs, a plurality of images and a plurality of advertisement traffic and rating information relating to each of the plurality of URLs, wherein each of the plurality of images shows the placement of an advertisement on the page accessed by a URL; presenting a traffic display that includes the plurality of images for the plurality of pages, wherein the plurality of images are user selectable; and, in response to selecting one of the plurality of images, presenting the advertiser with the advertisement traffic and rating information for a URL corresponding to the selected image and providing the advertiser with an opportunity to provide feedback information for the URL.

The following figures and their accompanying descriptions provide detailed examples of the implementation of the methods, systems, and media of the present invention.

Prior to displaying a real-time view of the URLs at an individual page level on which advertisements are served, the application can obtain and/or extract information relating to these URLs. The extracted information can include, for example, the text of the URL, image analysis, HyperText Markup Language (HTML) source code, site or domain registration information, ratings, categories, and/or labeling from partner or third party analysis systems (e.g., site content categories), source information of the images on the page, page text or any other suitable semantic analysis of the page content, metadata associated with the page, anchor text on other pages that point to the page of interest, ad network links and advertiser information taken from a page, hyperlink information, malicious code and spyware databases, site traffic volume data, micro-outsourced data, any suitable auxiliary derived information (e.g., ad-to-content ratio), and/or any other suitable combination thereof. As described herein, any suitable information relating to the page can be collected, extracted, and/or derived using one or more evidentiary sources.

In some embodiments, each URL (and its associated information) can be transmitted for image capture and data annotation. With regard to image capture, the application can obtain and/or store images of various resolution and size. For example, an exemplary screenshot of a webpage can be captured having a resolution of 300 dots per inch. In another example, the exemplary screenshot of the webpage can include the advertisement placed within the content of a particular publisher. With regard to data annotation, particular data associated with the URL can be obtained and/or stored, such as the date in the system, the date the URL was added by the advertiser, campaign information, publisher information, advertiser information, placement information, etc.

Using this application or any other suitable rating application (e.g., the AdSafe Rating Platform), evidence for a particular page or a particular website can be obtained. It should be noted that this can include, for example, retrieving a plurality of model-based ratings and a plurality of human-based ratings for a page, applying any suitable weight to each of the plurality of ratings, and combining the plurality of ratings and each applied weight to create a rating model associated with the page.

In some embodiments, the application can use the extracted information to generate a rating (R) for a webpage, a website, or any other suitable web content. For example, one or more ratings can be determined for a webpage, where ordinomial probabilities are used to encode both severity and confidence. That is, a rating (R) associated with a particular ordinomial, $p(y=b_i|x)$ that includes severity and confidence parameters is determined. In a more particular example, an advertiser may desire that the rating represents a particular confidence that the page's content is no worse than severity group within a particular category, such as no worse than the "high risk" severity level within the "Alcohol" category or no worse than the "Rated R" severity level within the "Adult" category. Alternatively, in another example, an advertiser may desire that the rating encodes the confidence that a particular webpage is no better than a particular severity group within a particular category.

Figure 1:
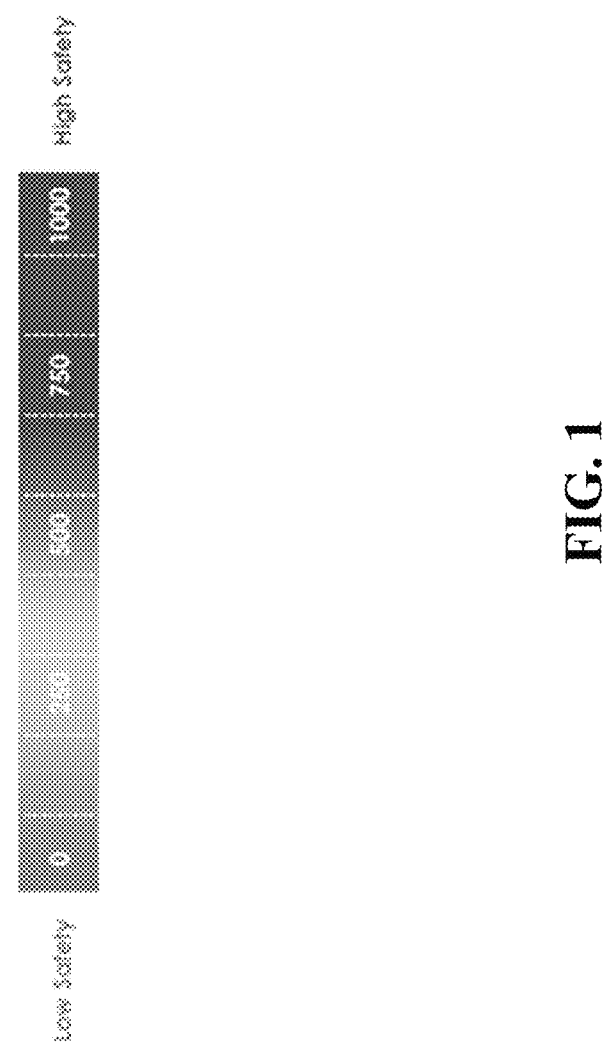

In some embodiments, the application can map the ratings onto a numeric scale of the numbers 0 through 1000, where the number 1000 denotes the least severe end or the highly safe portion of the scale. An illustrative example of the numeric rating scale is shown in FIG. 1. In another example, the rating scale can be further divided by the application such that particular portions of rating scale are determined to be the best pages—e.g., ratings that fall between the numbers 800 and 1000. Accordingly, if the application determines that there is a confidence value greater than a particular threshold (β) that the page's content is no worse than the best category, then the page's rating falls in the 800-1000 range.

Approaches for collecting and analyzing various pieces of evidence for generating ratings are further described in, for example, commonly-owned, commonly-assigned U.S. patent application Ser. No. 12/859,763, filed Aug. 19, 2010, and U.S. patent application Ser. No. 13/151,146, filed Jun. 1, 2011, which are hereby incorporated by reference herein in their entireties.

Upon obtaining particular information from one or more URLs, receiving information from the advertiser, and/or analyzing the obtained information, the application can display a real-time traffic view of the URLs at an individual page level on which advertisements are served.

Additionally, in some embodiments, a word cloud or any other suitable representation that identifies the phrases or words on the page that may be objectionable can be generated. The word cloud can highlight the severity and frequency of the words or phrases found on the page or metadata associated with the page.

FIGS. 2-8 show illustrative displays provided by the application for analyzing traffic and inventory management to substantially increase brand safety, quality, and value of display advertising inventory in accordance with some embodiments of the disclosed subject matter.

Figure 2:
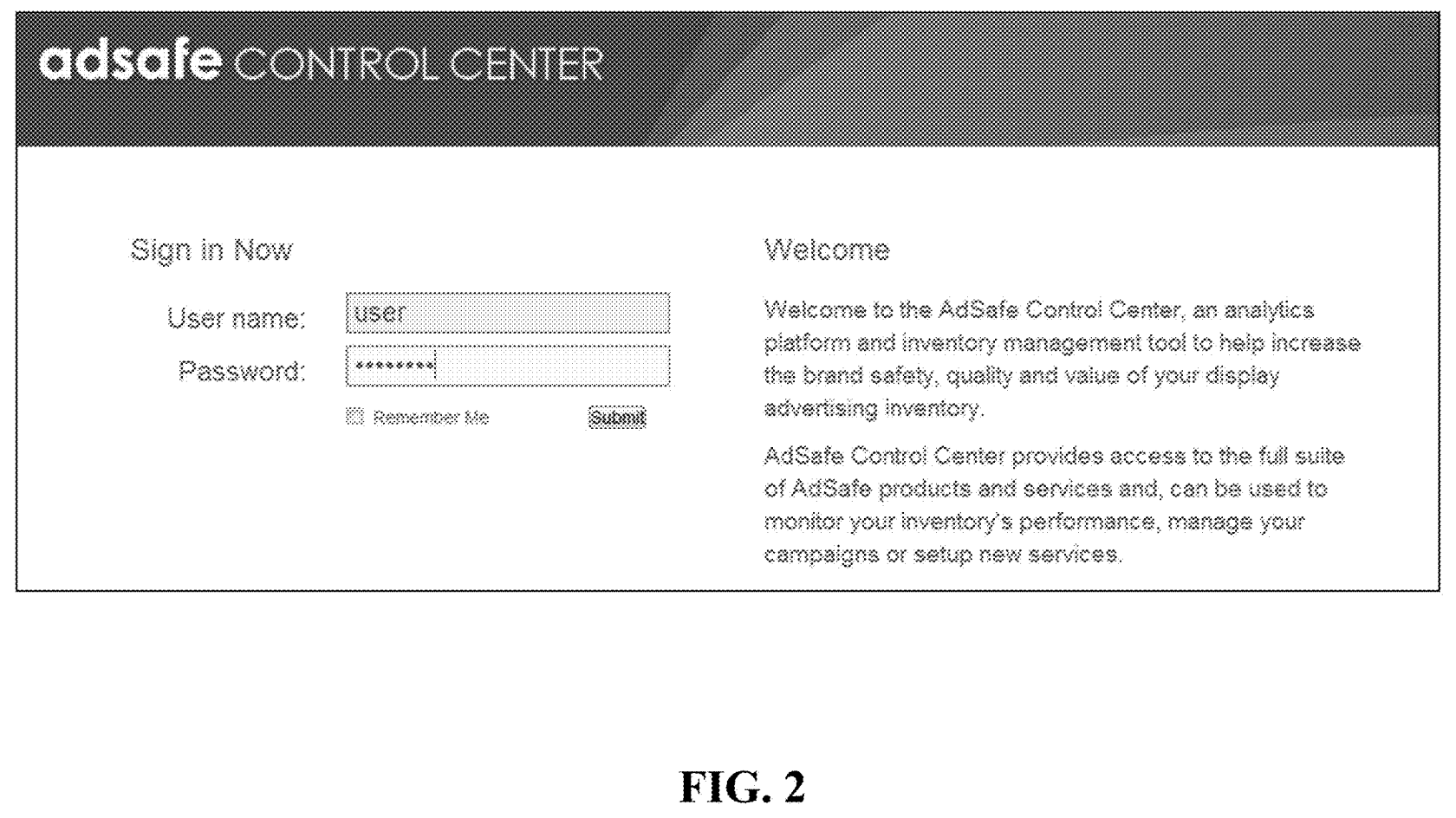

Turning to FIG. 2, the application can begin by providing the advertiser with a login display for inputting a username and a password. In addition, the advertiser can create an account that includes inputting the display advertising inventory associated with the advertiser. This can also include, for example, inputting URLs of the webpages or websites that the advertiser is interested in placing an advertisement. In response, the application can retrieve and/or extract information from the URLs, obtain representative screenshots of the URLs, etc. Alternatively, the application can allow the advertiser to provide a link or any other suitable connection to the advertisement database associated with the advertiser. In response to providing such a link, the application can access the advertisement database and obtain the necessary information associated with each advertisement stored in the advertisement database.

It should be noted that, based on user information (e.g., login name, password, etc.), each advertiser or user may be provided with a particular authority level. For example, in response to having a high authority level, an advertiser may be provided with an opportunity to provide feedback on a designated rating. In another example, an advertiser may be provided with an opportunity to exclude a particular page from future displays or reports. In yet another example, a user having a low authority level can be presented with read-only analytical screens for the URLs associated with the advertiser. In addition, the user with the low authority level can be prevented from providing feedback on ratings, advertisement placement evaluations, etc.

In response to logging into the application (FIG. 2), the application can provide the advertiser with an inventory dashboard screen shown in FIG. 3. As shown in FIG. 3, the application provides the advertiser with an opportunity to provide particular inputs for the analytical windows. For example, in window 310, the application provides the advertiser with an opportunity to select an analytical date information—e.g., yesterday, today, last month, last quarter, last year, etc. In another example, the application can allow the advertiser to input a custom start date and end date. As shown in window 310, in response to the advertiser inputting the date information of "Yesterday," the application provides the advertiser with the corresponding rating information. For this particular advertiser, the advertiser received an overall index of 136 while providing over four million advertisement impressions. Of those impressions, 87.1% were in the low risk level, 11% were in the moderate risk level, 1.1% were in the high risk level, and 0.1% were in the very high risk level over various categories.

Alternatively, the application can provide the advertiser with the opportunity to submit any suitable requirements, such as content category, number of records, and/or date range.

It should be noted that, with respect to categories, any suitable category and any suitable number of categories can be selected by an advertiser. For example, the four million advertisement impressions from FIG. 3 can include four severity or risk levels—e.g., low risk, moderate risk, high risk, and very high risk—can include multiple categories—e.g., adult, illegal drugs, alcohol, hate speech, offensive language, and malicious code (Trojans, warez, torrents, viruses, etc.).

As also shown in FIG. 3, the application also provides analytical windows 320, 330, 340, and 350 in the inventory dashboard screen. For example, window 320 shows a historical network index or rating associated with the advertiser for the last thirty days. Window 330 shows a publisher index that indicates how the advertiser and the advertiser's overall index compared with other advertisers, publishers, etc. Window 330 can include any other suitable trend information relating to other advertisers and/or publishers, such as advertisement impressions, index, URLs, advertisement space, etc.

Window 340 shows a publisher watch list that indicates multiple campaigns configured by the advertiser, the publishers used by the particular advertiser for the placement of advertisements, and the percentage of those campaigns and/or publisher content that fall within particular severity levels. For example, window 340 allows the advertiser to determine which publishers are provided high risk level pages for their advertisements. In another example, window 340 allows the advertiser to determine its best campaigns or publishers (e.g., those with a substantial percentage of low risk placements) and its worst campaigns or publishers (e.g., those with a substantial percentage of high risk and very high risk placements).

Figure 4:
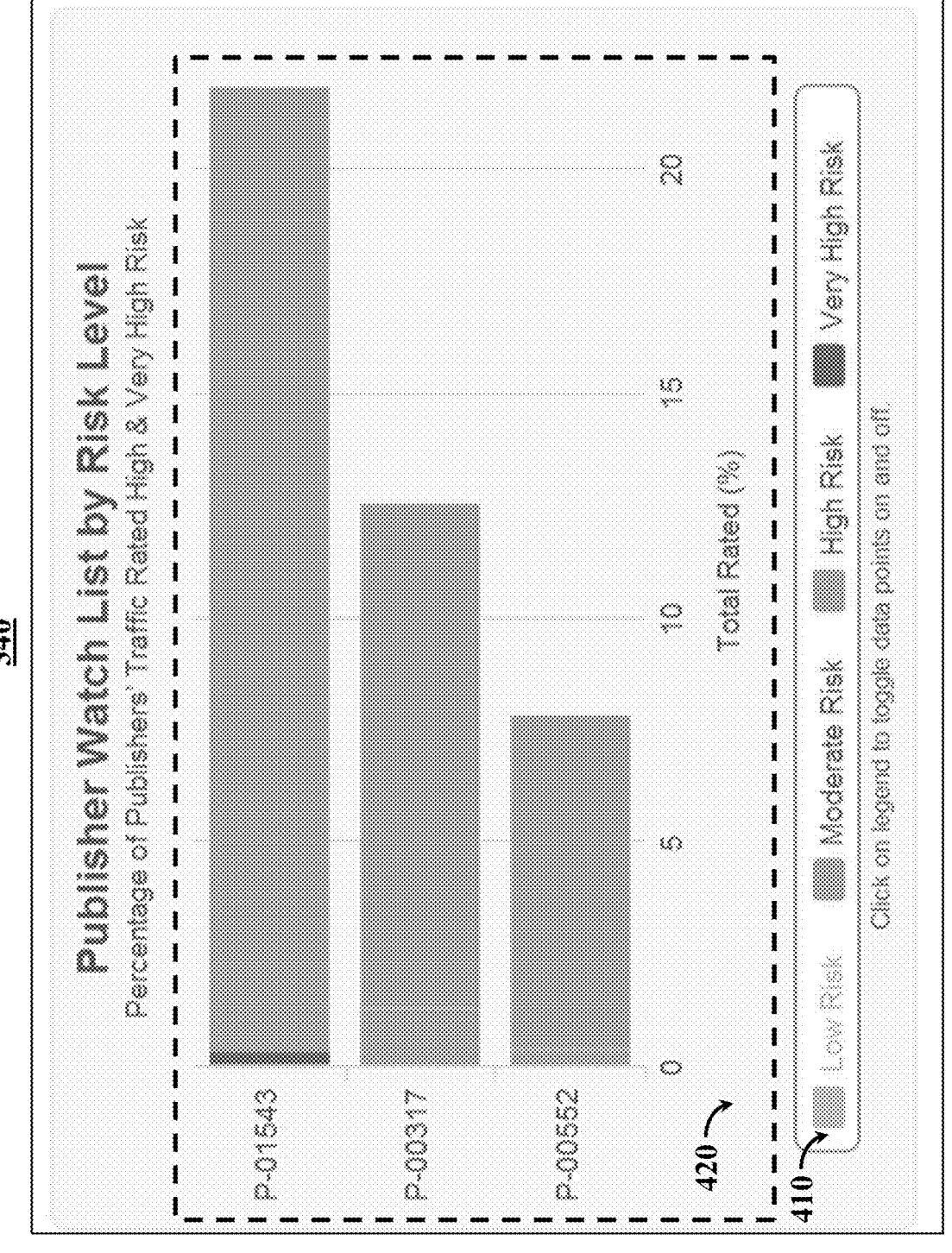
FIG. 4 is an illustrative publisher watch list screen sorted by severity or risk level displayed by the application in accordance with some embodiments of the disclosed subject matter.

FIG. 4 provides a detailed view of the illustrative publisher watch window 340 of FIG. 3. As shown, the application provides the advertiser with the opportunity to input particular severity levels of interest—e.g., by selecting only moderate risk, high risk, and very high risk within severity options 410. In response, the application presents the advertiser with publisher watch data in graph 420. This allows the advertiser to review campaigns and/or publishers based on the number of impressions, risk data, etc.

Referring back to FIG. 3, in some embodiments, the application can provide the advertiser with window 350 that analyzes campaigns and/or publishers based on objectionable content category. That is, window 350 can indicate the publishers that are provided advertisements for placement with content of that publisher and the percentage of that content that falls within particular objectionable categories. For example, window 350 allows the advertiser to determine which publishers have high risk and very high risk content falling within particular objectionable categories—e.g., adult, illegal drugs, alcohol, hate speech, offensive language, and/or malicious code (e.g., trojans, warez, torrents, viruses, etc.).

It should be noted that there can be several categories of objectionable content that may be of interest. For example, these categories can include content that relates to guns, bombs, and/or ammunition (e.g., sites that describe or provide information on weapons including guns, rifles, bombs, and ammunition, sites that display and/or discuss how to obtain weapons, manufacture of weapons, trading of weapons (whether legal or illegal), sites which describes or offer for sale weapons including guns, ammunition, and/or firearm accessories, etc.). In another example, these categories can include content relating to alcohol (e.g., sites that provide information relating to alcohol, sites that provide recipes for mixing drinks, sites that provide reviews and locations for bars, etc.), drugs (e.g., sites that provide instructions for or information about obtaining, manufacturing, or using illegal drugs), and/or tobacco (e.g., sites that provide information relating to smoking, cigarettes, chewing tobacco, pipes, etc.). In yet another example, these categories can include offensive language (e.g., sites that contain swear words, profanity, hard language, inappropriate phrases and/or expressions), hate speech (e.g., sites that advocate hostility or aggression towards individuals or groups on the basis of race, religion, gender, nationality, or ethnic origin, sites that denigrate others or justifies inequality, sites that purport to use scientific or other approaches to justify aggression, hostility, or denigration), and/or obscenities (e.g., sites that display graphic violence, the infliction of pain, gross violence, and/or other types of excessive violence). In another example, these categories can include adult content (e.g., sites that contain nudity, sex, use of sexual language, sexual references, sexual images, and/or sexual themes). In another example, these categories can include spyware or malicious code (e.g., sites that provide instructions to practice illegal or unauthorized acts of computer crime using technology or computer programming skills, sites that contain malicious code, etc.) or other illegal content (e.g., sites that provide instructions for threatening or violating the security of property or the privacy of others, such as theft-related sites, locking picking and burglary-related sites, fraud-related sites).

Figure 5:
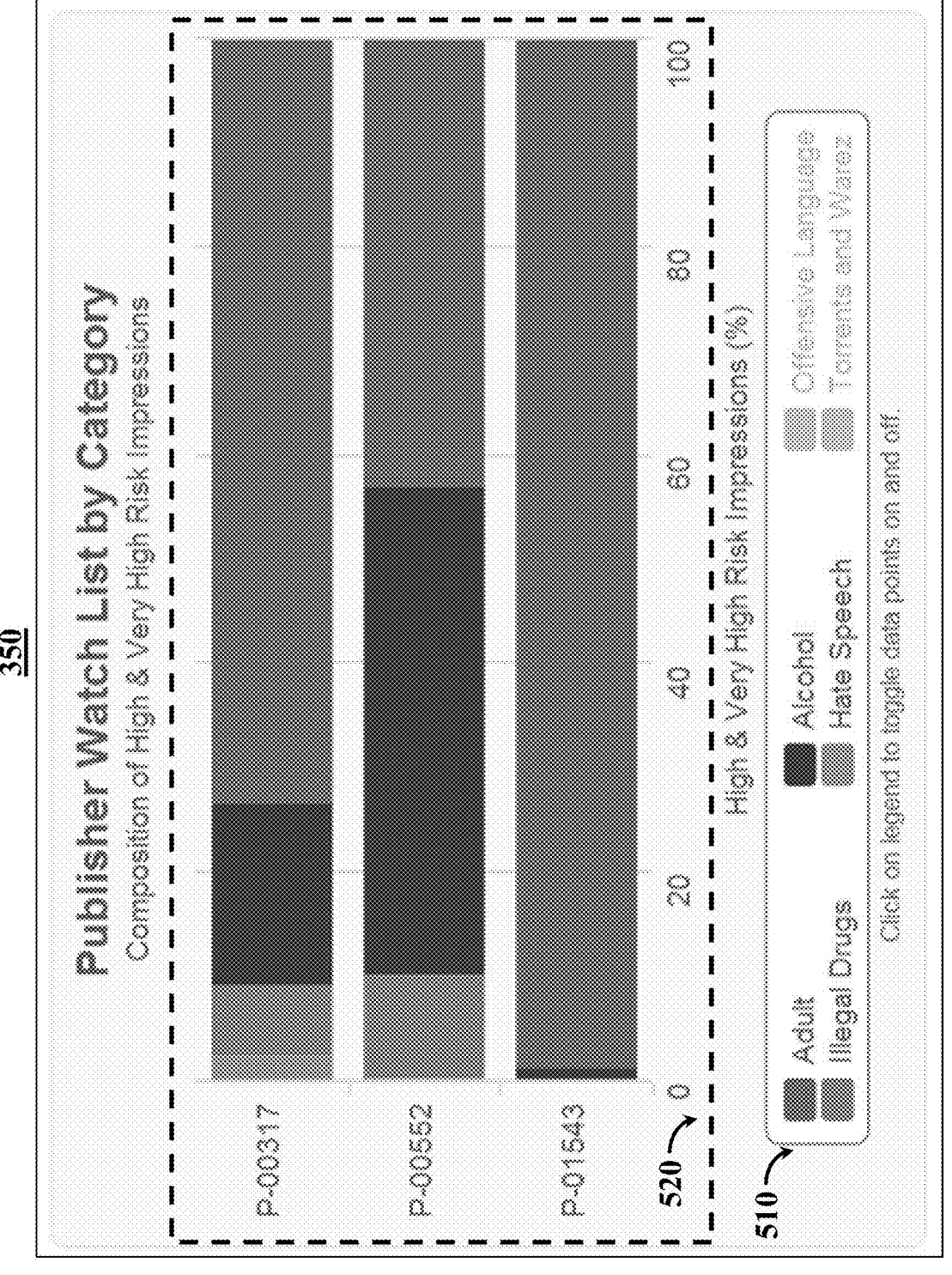
FIG. 5 is an illustrative publisher watch list screen sorted by objectionable category displayed by the application in accordance with some embodiments of the disclosed subject matter.

FIG. 5 provides a detailed view of the illustrative publisher watch window 350 of FIG. 3. As shown, the application provides the advertiser with the opportunity to input particular categories of interest—e.g., by selecting adult, illegal drugs, alcohol, and hate speech within objectionable categories options 510. In response, the application presents the advertiser with publisher watch data in graph 520. This allows the advertiser to review publishers used for advertisement placement based on percentage of impressions, risk data, etc. This also allows the advertiser to determine which publishers have content on their webpages or websites that falls within particular objectionable categories. In a more particular example, the advertiser can review which campaigns created by the advertiser are being displayed on webpages or websites that fall within the adult content category or which publishers used by the advertiser are providing content adjacent to their advertisements that fall within the adult content category. In response, the advertiser can edit and/or remove particular campaigns and edit and/or remove particular publishers based on the analysis provided in publisher watch window 350 or any other suitable window.

Figure 6:
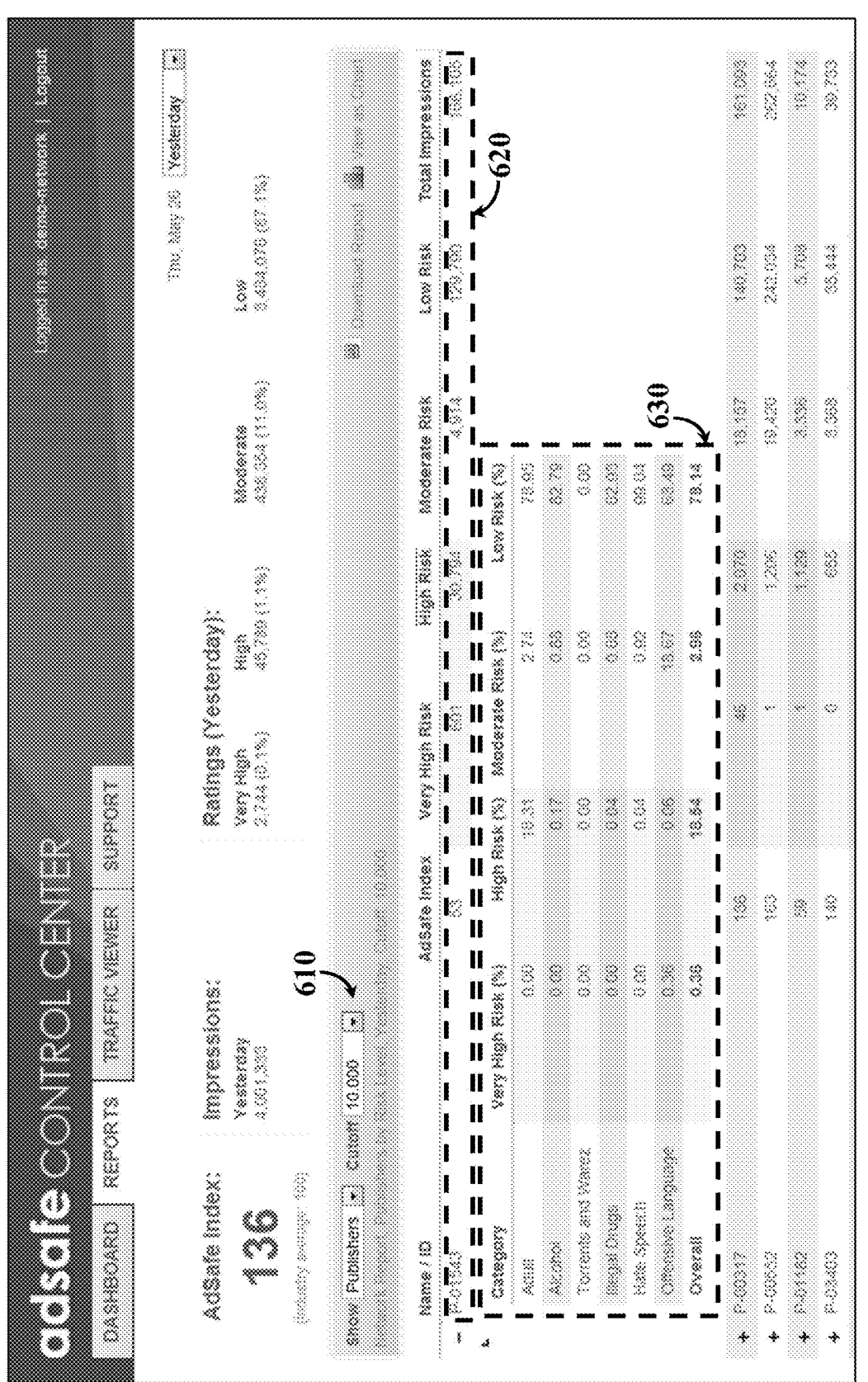
FIG. 6 is an illustrative publisher reporting screen displayed by the application in accordance with some embodiments of the disclosed subject matter.

In some embodiments, the application can provide the advertiser with reporting features. For example, as shown in FIG. 6, the advertiser can request detailed information on particular publishers and/or particular campaigns. As particularly shown in input area 610 of FIG. 6, the advertiser has requested that the application generate a report that specifies publishers used by the advertiser for their advertisements, where the report is sorted by risk level. The application provides the advertiser with a report that includes detailed rating and/or risk information, such as entry 620. Entry 620 indicates that publisher "P-01543" has a risk rating of 53, which was calculated based at least on determining that 601 "very high risk" level impressions and 30,794 "high risk" level impressions occurred on the publisher's website(s). As also shown in FIG. 6, the application allows the advertiser to expand each entry to review additional information relating to a particular publisher. For example, in response to expanding entry 620, the application provides the advertiser with window 630 that provides multiple categories of objectionable content and an indication of which categories the content of the particular publisher fell in. In a more particular example, window 630 shows that 18.3% of the advertisement impressions were displayed adjacent to the publisher's content that fell within the "high risk" severity level of the adult content category. In response, the advertiser can use the application to modify advertisement placement by, for example, removing particular publishers, modifying the types of advertisements that are directed to particular publishers, modifying campaigns to show advertisements at particular times of the day, etc.

Figure 7:
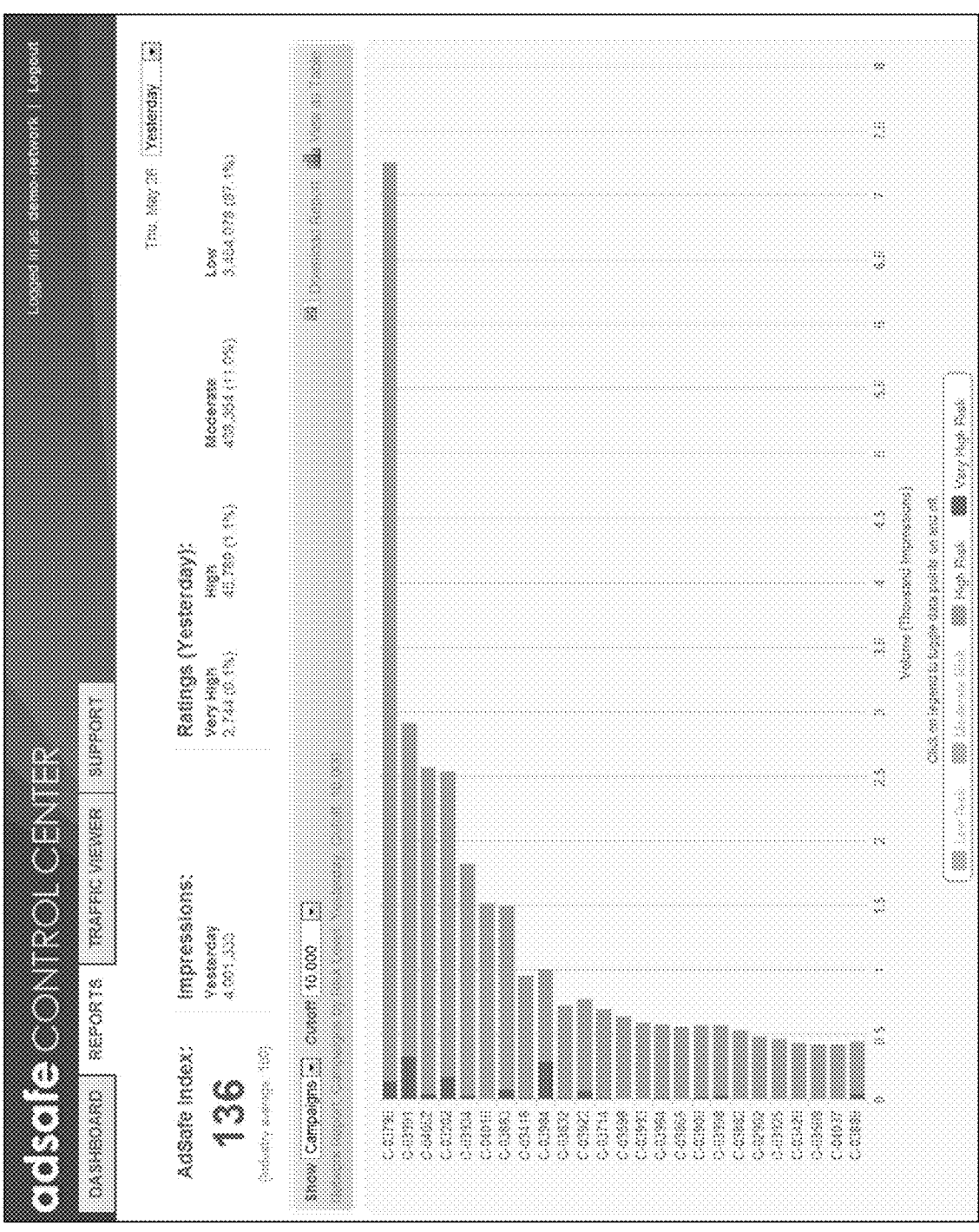
FIG. 7 is an illustrative campaign reporting screen displayed by the application in accordance with some embodiments of the disclosed subject matter.

Additionally or alternatively, as shown in FIG. 7, the advertiser can request detailed information on particular campaigns. FIG. 7 shows an illustrative chart of particular campaigns where the advertisements were provided on websites or webpages having content that fell within the "high risk" and "very high risk" severity levels of various categories. As described above, the advertiser can use the illustrative chart of particular campaigns shown in FIG. 7 or any other suitable information to modify campaigns and/or remove campaigns. For example, the advertiser can configure the application to alert the advertiser of the top ten campaigns for the particular week that fall within the "very high risk" severity level of the adult category. In another example, the advertiser can configure the application automatically remove particular campaigns based on inputted criteria (e.g., remove all campaigns that have over 10% of impressions within the high risk level of the adult content category).

Figure 8:
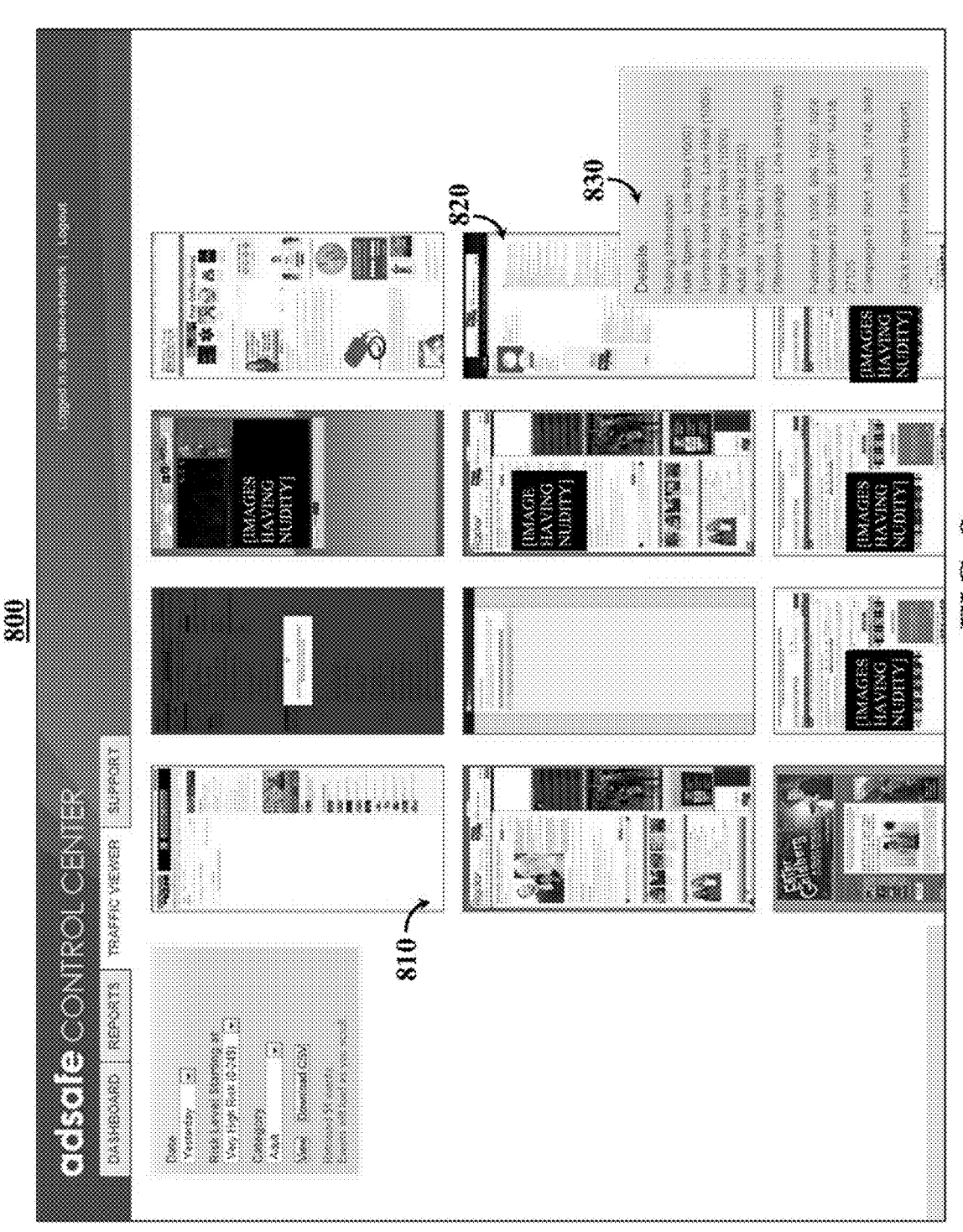
FIG. 8 is an illustrative traffic viewer screen displayed by the application in accordance with some embodiments of the disclosed subject matter.

In some embodiments, the application provides the advertiser with a traffic view screen in accordance with some embodiments of the disclosed subject matter. As shown in FIG. 8, the application provides the advertiser with the opportunity to submit particular traffic requirements, such as content category, risk or severity level, number of impressions, and/or date range. In response to entering particular traffic requirements, the application generates an illustrative traffic view screen 800 shown in FIG. 8. Generally speaking, the application provides the advertiser with an interactive user interface that displays advertisement traffic and allows the advertiser to scroll through their traffic based on the submitted requirements. In a more particular example, as shown in FIG. 8, the advertiser has provided the input requirements of very high risk level content in the adult content category for yesterday's advertisement impressions and the application displays 51 events or webpage screenshots 810 and 820 representative of the placement of particular advertisements matching the inputted requirements.

In response to inputting traffic requirements, the application generates traffic view screen 800 that displays a real-time view of the uniform resource locators at an individual page level on which advertisements are served. The application can be used to monitor the performance of an advertiser's inventory (e.g., advertisements served on websites managed by publishers), manage campaigns, manage publishers, and/or evaluate or configure the placement of advertisements on particular web pages. For example, using traffic view screen 800, the application can provide the advertiser with a single real-time view of advertisements placed on web pages that fall within the "high risk" level of the adult content category. In another example, using traffic view screen 800, the application can provide the advertiser with a single real-time view of publishers that are providing content that falls within the "high risk" level of the alcohol category. In yet another example, using traffic view screen 800, the application can provide the advertiser with a single real-time view of advertisements that have been placed adjacent to "high risk" level content across multiple categories.

As also shown in FIG. 8, in response to the advertiser placing a cursor or any other suitable pointer over one of the events, such as event 820, the application can provide the advertiser with additional information, such as rating information (e.g., particular categories and particular severity levels), publisher information, advertisement information, campaign information, and/or any other suitable information relating to the particular event.

Figure 9:
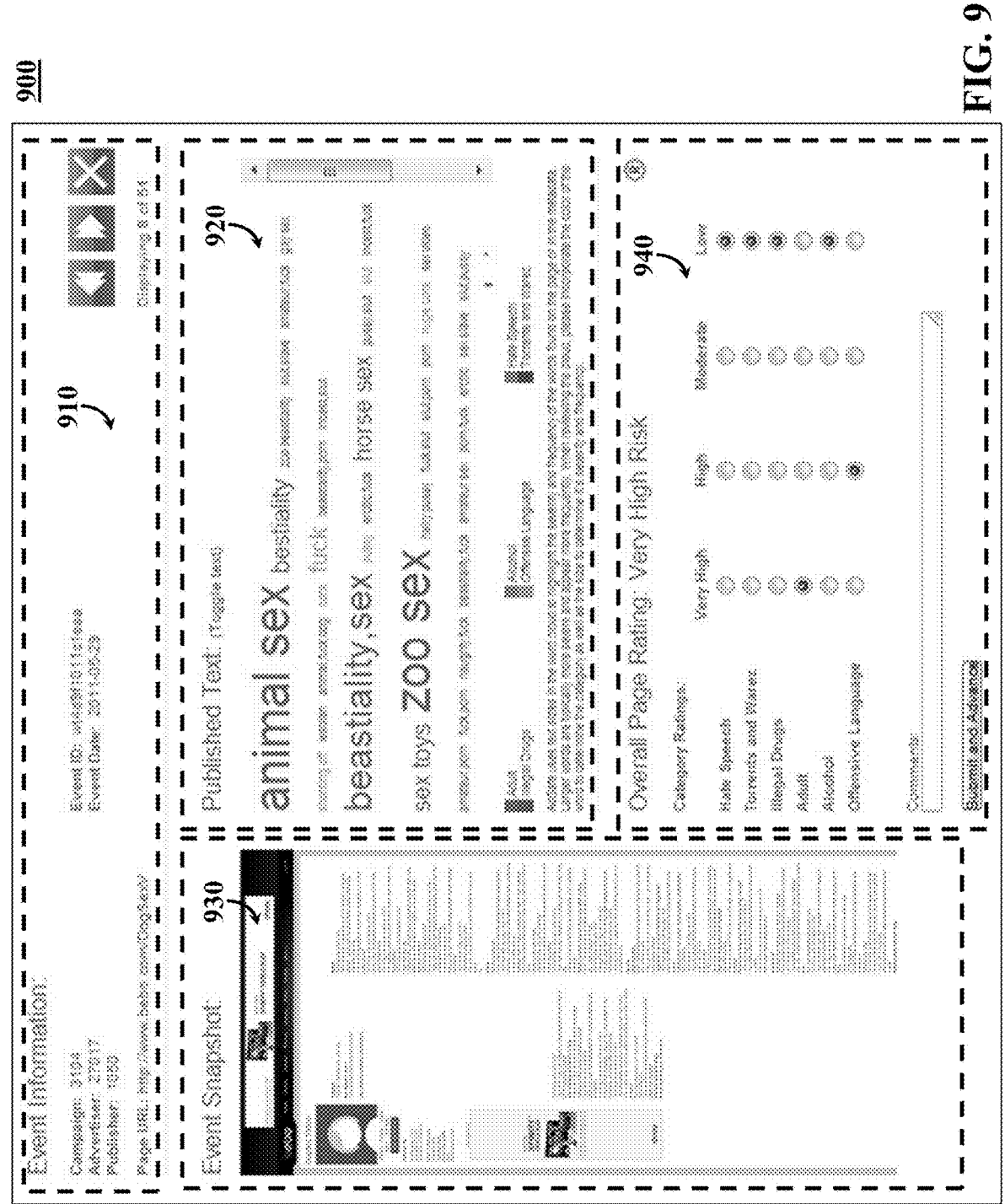
FIG. 9 is an illustrative detailed traffic event reporting screen displayed by the application in accordance with some embodiments of the disclosed subject matter.

In response to the advertiser selecting an event (e.g., an image or screenshot associated with a particular page) in the traffic view screen 800 of FIG. 8, the application can provide the advertiser with a detailed traffic event reporting screen 900 of FIG. 9. As shown in FIG. 9, the application can provide the advertiser with detailed information 910 relating to the selected event, such as the URL of the page, the corresponding date created in the system, particular metadata relating to the page (e.g., campaign, publisher, advertiser, placement information, etc.), and/or the number of impressions associated to the page in the selected date range. In addition, the application can allow the advertiser to view how the advertisement is placed on a particular webpage (e.g., by selecting a link, by displaying a screenshot, etc.).

In some embodiments, within traffic event reporting screen 900, the application can provide the advertiser with a word cloud 920 or any other suitable representation that identifies the phrases or words on the page that may be considered objectionable. The word cloud 920 can, for example, highlight the severity and frequency of the words or phrases found on the page or metadata associated with the page. As shown in FIG. 9, in some embodiments, the larger and the brighter the display of a particular word or phrase can identify those that are more severely objectionable.

In some embodiments, the application can allow the advertiser to enlarge a screenshot 930 of the page including the advertisement. In response to selecting the screenshot 930 in FIG. 9, the application can obtain a previously stored image of greater resolution and/or greater size from a database for display.

In some embodiments, the application can allow the advertiser to provide feedback relating to traffic and rating information in area 940. For example, as shown in FIG. 9, the advertiser can indicate that the advertiser disagrees with the assigned rating. In response to providing the feedback information, the application can, for example, recalculate the rating, transmit the URL back to another application (e.g., the AdSafe Rating Platform), etc.

Figure 10:
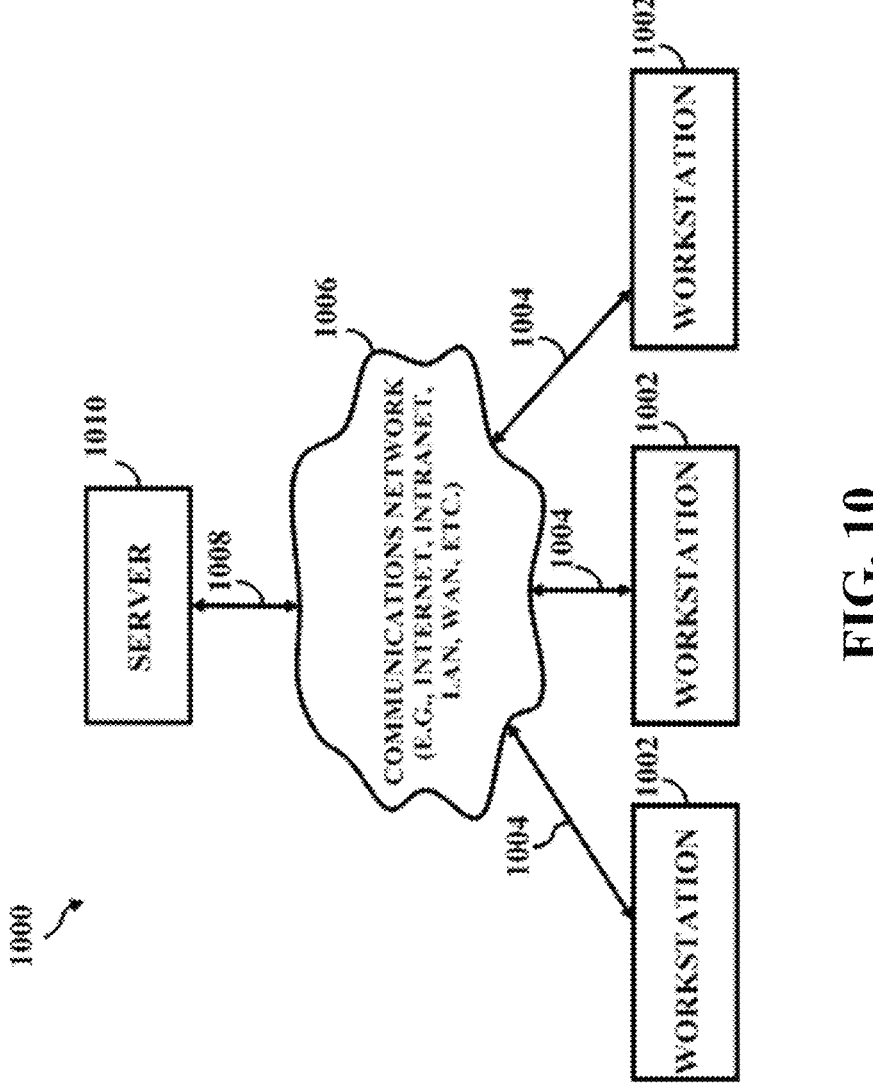
FIG. 10 is a diagram of an illustrative system on which a rating application can be implemented in accordance with some embodiments of the disclosed subject matter.

FIG. 10 is a generalized schematic diagram of a system 1000 on which the interactive inventory management application may be implemented in accordance with some embodiments of the disclosed subject matter. As illustrated, system 1000 may include one or more user computers 1002. User computers 1002 may be local to each other or remote from each other. User computers 1002 are connected by one or more communications links 1004 to a communications network 1006 that is linked via a communications link 1008 to a server 1010.

System 1000 may include one or more servers 1010. Server 1010 may be any suitable server for providing access to the application, such as a processor, a computer, a data processing device, or a combination of such devices. For example, the application can be distributed into multiple backend components and multiple frontend components or interfaces. In a more particular example, backend components, such as data collection and data distribution can be performed on one or more servers 1010. Similarly, the graphical user interfaces displayed by the application, such as a data interface and an advertising network interface, can be distributed by one or more servers 1010 to user computer 1002.

More particularly, for example, each of the client 1002 and server 1010 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client 1002 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EE-PROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 10, communications network 1006 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1004 and 1008 may be any communications links suitable for communicating data between user computers 1002 and server 1010, such as network links, dial-up links, wireless links, hard-wired links, any other suitable communications links, or a combination of such links. User computers 1002 enable a user to access features of the application. User computers 1002 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. User computers 1002 and server 1010 may be located at any suitable location. In one embodiment, user computers 1002 and server 1010 may be located within an organization. Alternatively, user computers 1002 and server 1010 may be distributed between multiple organizations.

Figure 11:
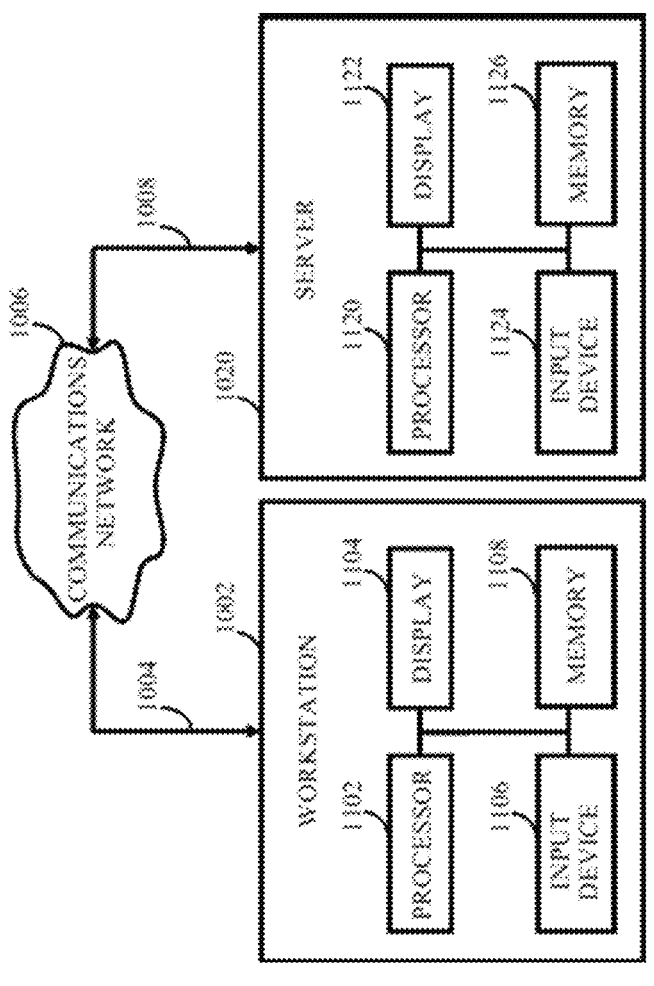
FIG. 11 is a diagram of an illustrative user computer and server as provided, for example, in FIG. 10 in accordance with some embodiments of the disclosed subject matter.

Referring back to FIG. 10, the server and one of the user computers depicted in FIG. 10 are illustrated in more detail in FIG. 11. Referring to FIG. 11, user computer 1002 may include processor 1102, display 1104, input device 1106, and memory 1108, which may be interconnected. In a preferred embodiment, memory 1108 contains a storage device for storing a computer program for controlling processor 1102.

Processor 1102 uses the computer program to present on display 1104 the application and the data received through communications link 1004 and commands and values transmitted by a user of user computer 1002. It should also be noted that data received through communications link 1004 or any other communications links may be received from any suitable source. Input device 1106 may be a computer keyboard, a cursor-controller, dial, switchbank, lever, or any other suitable input device as would be used by a designer of input systems or process control systems.

Server 1010 may include processor 1120, display 1122, input device 1124, and memory 1126, which may be interconnected. In a preferred embodiment, memory 1126 contains a storage device for storing data received through communications link 1008 or through other links, and also receives commands and values transmitted by one or more users. The storage device further contains a server program for controlling processor 1120.

In some embodiments, the application may include an application program interface (not shown), or alternatively, the application may be resident in the memory of user computer 1002 or server 1010. In another suitable embodiment, the only distribution to user computer 1002 may be a graphical user interface ("GUI") which allows a user to interact with the application resident at, for example, server 1010.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Accordingly, methods, systems, and media for reviewing content traffic are provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for reviewing advertisement placement on webpages, the method comprising:

receiving, using a server that includes a hardware processor, a plurality of uniform resource locators (URLs) relating to the placement of a plurality of advertisements associated with an advertiser;

obtaining, using the hardware processor, a plurality of images and a plurality of advertisement traffic and rating information relating to each of the plurality of URLs, wherein each of the plurality of images shows the placement of one of the plurality of advertisements associated with the advertiser on a webpage accessed by one of the plurality of URLs;

extracting, for each of the plurality of URLs, severity information associated with the content that appears on a page associated with one of the plurality of URLs;

presenting, using the hardware processor, a first user interface that includes a plurality of selectable representations of each of the plurality of URLs including the plurality of images, wherein the plurality of images are selectable by the advertiser; and in response to the advertiser selecting a selectable representation from the plurality of selectable representations using the first user interface, presenting, using the hardware processor, a second user interface that provides the advertiser with an opportunity to analyze the placement of the selectable representation of the plurality of advertisements on one of the plurality of URLs, wherein the second user interface includes (1) advertisement traffic associated with a URL corresponding to the selectable representation in a first region of the second user interface, (2) rating information for the URL corresponding to the selectable representation in a second region of the second user interface, wherein the rating information for the URL corresponding to the selectable representation includes an indication of severity level within each of a plurality of content categories based on the extracted severity information associated with the content that appears on the page and an indication of overall risk corresponding to the URL based on the extracted severity information associated with the content that appears on the page, and (3) a word level representation that visually indicates frequency and severity of the content that appears on the page associated with the URL corresponding to the selectable representation.

2. The method of claim 1, further comprising:

receiving traffic requirements that include at least one of risk level and objectionable content category; and presenting the second user interface based at least in part on the received traffic requirements.

3. The method of claim 1, further comprising:

extracting information relating to the URL corresponding to the selectable representation;

generating a rating for the URL corresponding to the selectable representation based at least in part on the extracted information; and associating the generated rating with the URL corresponding to the selectable representation.

4. The method of claim 1, further comprising presenting the advertiser with a display for reviewing the advertisement placement based on publisher and risk level.

5. The method of claim 1, further comprising presenting the advertiser with a display for reviewing the advertisement placement based on publisher and objectionable content category.

6. The method of claim 1, wherein the advertisement traffic information for the URL corresponding to the selectable representation includes at least one of: a number of advertisement impressions, campaign information, advertiser information, publisher information, and event information.

7. The method of claim 1, wherein a first word in the word level representation is displayed with a first size and a first color and a second word in the word level representation is displayed with a second size and a second color, wherein the first size, the second size, the first color, and the second color are selected based at least in part on severity and frequency of the first word in comparison with the second word.

8. The method of claim 1, wherein the second user interface further comprises a feedback region that provides the advertiser with an opportunity to provide feedback information for the rating information associated with the URL.

9. The method of claim 1, wherein, in response to detecting a hover event over the selectable representation of the plurality of selectable representations, a third user interface is presented that includes a summary of the second user interface, wherein the third user interface is presented concurrently with and proximal to the selectable representation in the first user interface.

10. A system for reviewing advertisement placement on webpages, the system comprising:

a hardware processor that:

receives a plurality of uniform resource locators (URLs) relating to the placement of a plurality of advertisements associated with an advertiser;

obtains a plurality of images and a plurality of advertisement traffic and rating information relating to each of the plurality of URLs, wherein each of the plurality of images shows the placement of one of the plurality of advertisements associated with the advertiser on a webpage accessed by one of the plurality of URLs;

extracts, for each of the plurality of URLs, severity information associated with the content that appears on a page associated with one of the plurality of URLs;

presents a first user interface that includes a plurality of selectable representations of each of the plurality of URLs including the plurality of images, wherein the plurality of images are selectable by the advertiser; and in response to the advertiser selecting a selectable representation from the plurality of selectable representations using the first user interface, presents a second user interface that provides the advertiser with an opportunity to analyze the placement of the selectable representation of the plurality of advertisements on one of the plurality of URLs, wherein the second user interface includes (1) advertisement traffic associated with a URL corresponding to the selectable representation in a first region of the second user interface, (2) rating information for the URL corresponding to the selectable representation in a second region of the second user interface, wherein the rating information for the URL corresponding to the selectable representation includes an indication of severity level within each of a plurality of content categories based on the extracted severity information associated with the content that appears on the page and an indication of overall risk corresponding to the URL based on the extracted severity information associated with the content that appears on the page, and (3) a word level representation that visually indicates frequency and severity of the content that appears on the page associated with the URL corresponding to the selectable representation.

11. The system of claim 10, wherein the hardware processor further:
   receives traffic requirements that include at least one of risk level and objectionable content category; and
   presents the second user interface based at least in part on the received traffic requirements.

12. The system of claim 10, wherein the hardware processor further:
   extracts information relating to the URL corresponding to the selectable representation;
   generates a rating for the URL corresponding to the selectable representation based at least in part on the extracted information; and
   associates the generated rating with the URL corresponding to the selectable representation.

13. The system of claim 10, wherein the hardware processor further presents the advertiser with a display for reviewing the advertisement placement based on publisher and risk level.

14. The system of claim 10, wherein the hardware processor further presents the advertiser with a display for reviewing the advertisement placement based on publisher and objectionable content category.

15. The system of claim 10, wherein the advertisement traffic information for the URL corresponding to the selectable representation includes at least one of: a number of advertisement impressions, campaign information, advertiser information, publisher information, and event information.

16. The system of claim 10, wherein a first word in the word level representation is displayed with a first size and a first color and a second word in the word level representation is displayed with a second size and a second color, wherein the first size, the second size, the first color, and the second color are selected based at least in part on severity and frequency of the first word in comparison with the second word.

17. The system of claim 10, wherein the second user interface further comprises a feedback region that provides the advertiser with an opportunity to provide feedback information for the rating information associated with the URL.

18. The system of claim 10, wherein, in response to detecting a hover event over the selectable representation of the plurality of selectable representations, a third user interface is presented that includes a summary of the second user interface, wherein the third user interface is presented concurrently with and proximal to the selectable representation in the first user interface.

19. A non-transitory computer-readable medium containing computer executable instructions that, when executed by a processor, cause the processor to perform a method for reviewing advertisement placement on webpages, the method comprising:
   receiving a plurality of uniform resource locators (URLs) relating to the placement of a plurality of advertisements associated with an advertiser;
   obtaining a plurality of images and a plurality of advertisement traffic and rating information relating to each of the plurality of URLs, wherein each of the plurality of images shows the placement of one of the plurality of advertisements associated with the advertiser on a webpage accessed by one of the plurality of URLs;
   extracting, for each of the plurality of URLs, severity information associated with the content that appears on a page associated with one of the plurality of URLs;
   presenting a first user interface that includes a plurality of selectable representations of each of the plurality of URLs including the plurality of images, wherein the plurality of images are selectable by the advertiser; and
   in response to the advertiser selecting a selectable representation from the plurality of selectable representations using the first user interface, presenting a second user interface that provides the advertiser with an opportunity to analyze the placement of the selectable representation of the plurality of advertisements on one of the plurality of URLs, wherein the second user interface includes (1) advertisement traffic associated with a URL corresponding to the selectable representation in a first region of the second user interface, (2) rating information for the URL corresponding to the selectable representation in a second region of the second user interface, wherein the rating information for the URL corresponding to the selectable representation includes an indication of severity level within each of a plurality of content categories based on the extracted severity information associated with the content that appears on the page and an indication of overall risk corresponding to the URL based on the extracted severity information associated with the content that appears on the page, and (3) a word level representation that visually indicates frequency and severity of the content that appears on the page associated with the URL corresponding to the selectable representation.

* * * * *